Oct. 11, 1927.  
J. SACHS,  
1,645,453
ELECTRICAL CONNECTION BLOCK
Filed June 21, 1922  3 Sheets-Sheet 1
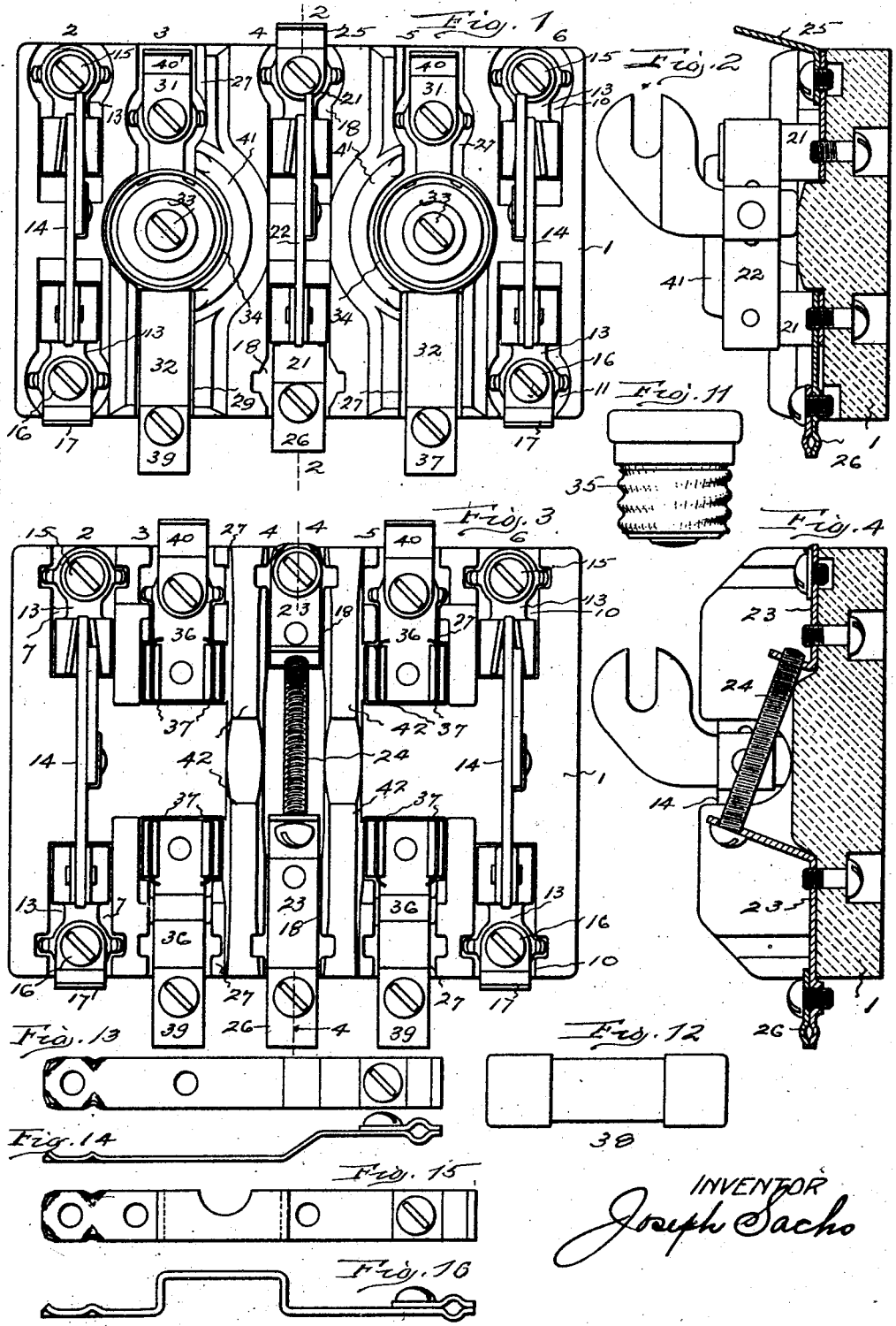
INVENTOR  
Joseph Sachs Oct. 11, 1927.
J. SACHS
1,645,453
ELECTRICAL CONNECTION BLOCK
Filed June 21, 1922
3 Sheets-Sheet 2
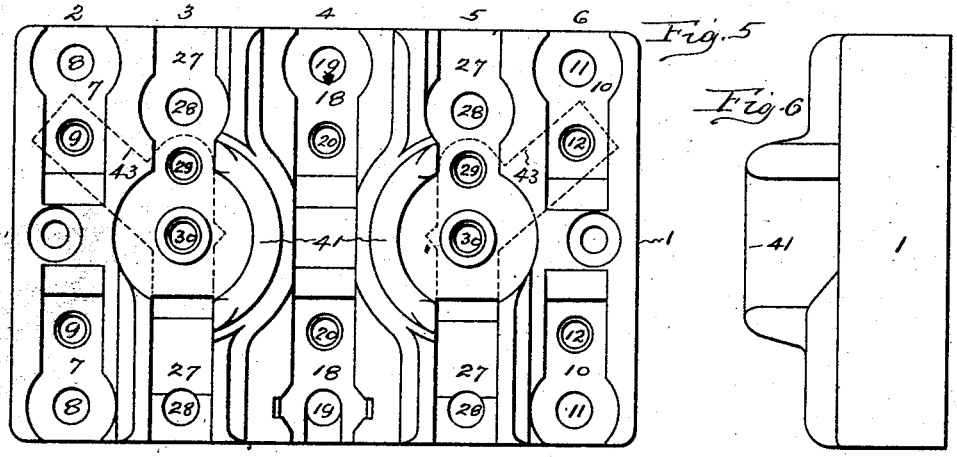
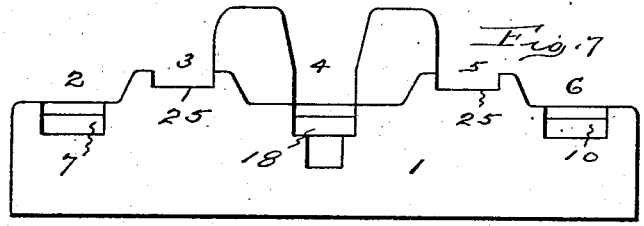
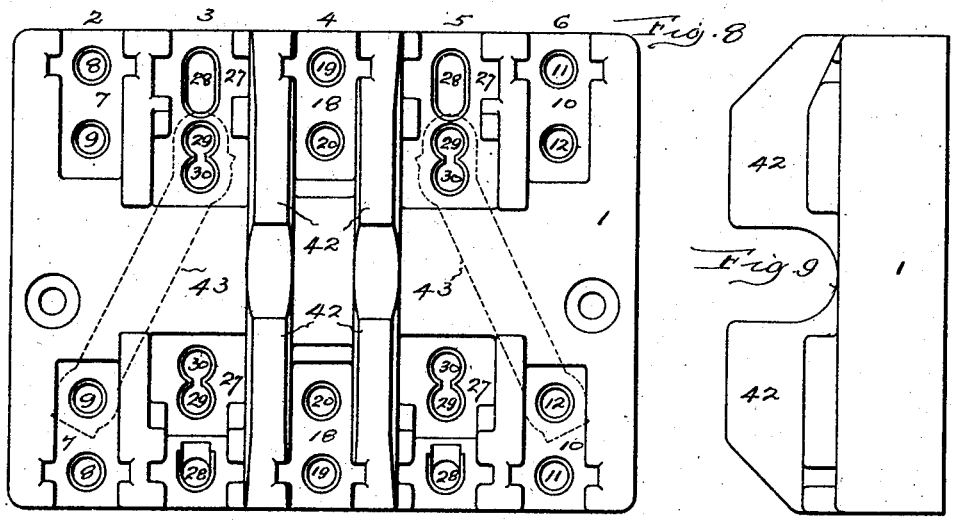
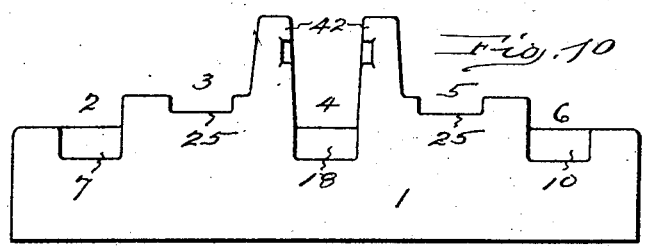
INVENTOR
Joseph Sachs Oct. 11, 1927.
J. SACHS
1,645,453
ELECTRICAL CONNECTION BLOCK
Filed June 21, 1922    3 Sheets-Sheet 3
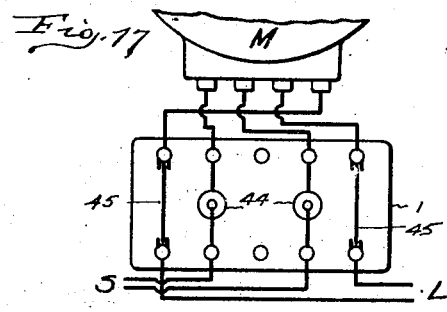
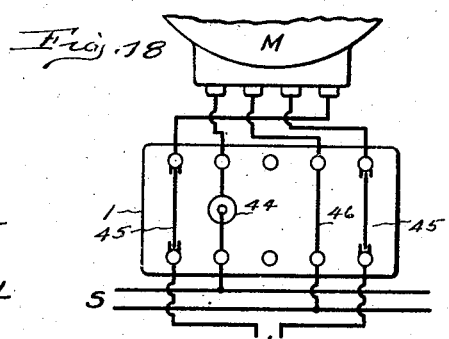
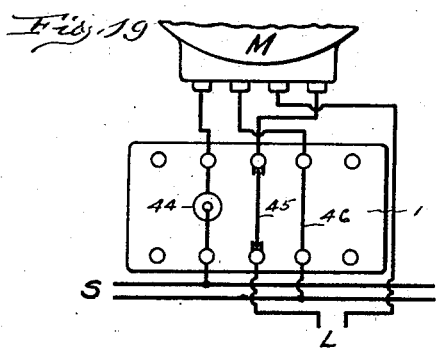
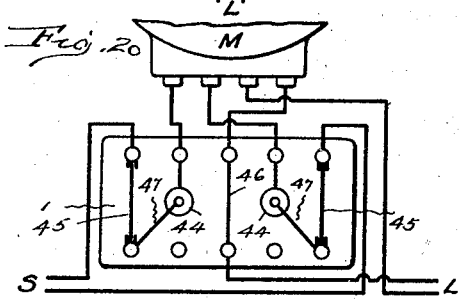
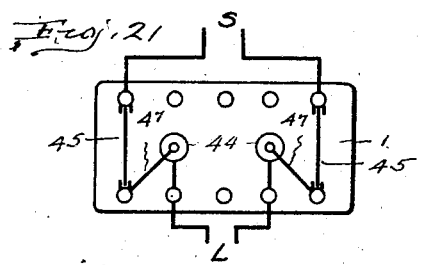
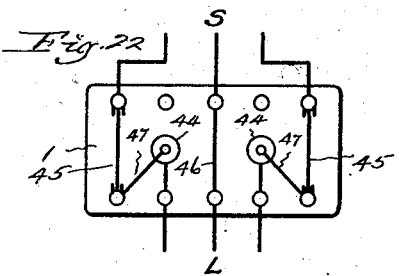
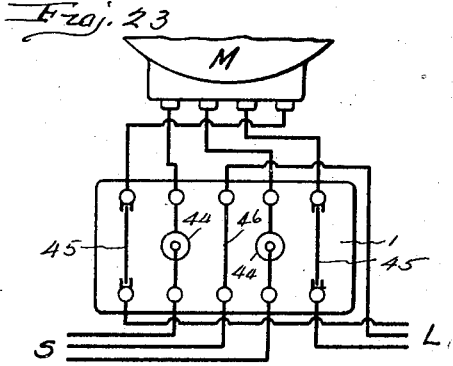
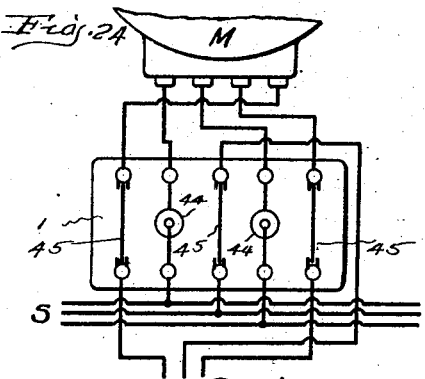
INVENTOR
Joseph Sachs Patented Oct. 11, 1927.

1,645,453

UNITED STATES PATENT OFFICE.

JOSEPH SACHS, OF HARTFORD, CONNECTICUT.

ELECTRICAL CONNECTION BLOCK.

Application filed June 21, 1922. Serial No. 569,807.

This invention relates to electrical service connection devices. These devices are commonly placed in protective cabinets and arranged in connection with meters, between the service wires and the load wires of electrical installations. They are usually provided with switches and fuses, and sometimes with detachable connectors and means for the attachment of meter testing instruments. It has been common to connect these devices so that there will be a fuse on one side, usually the service side, of the meter, and a switch on the other, or load side of the meter. When so arranged the switch may serve both as the main service and load controlling switch and also as a meter testing switch.

In devices of this character it is necessary in order to meet the rules and regulations of the fire underwriters that there be certain spacings between the switching parts and contacts of opposite polarity, that is to say, the switching elements for each pole must be spaced from those of the other pole an adequate distance to ensure safe circuit rupturing operation. In the prior devices, to have the requisite spacings between the switching elements and also to provide the meter testing facilities, an arrangement of the elements was considered necessary which required bases of one size for two wire installations, and larger bases or the building up of the bases of several independent blocks for three wire installations, and this made inevitable the use of larger cabinets for three wire than two wire devices, or the use of unnecessarily large cabinets for two wire devices.

The present inventive concept is the disposition and arrangement of conducting connector elements and the provision of a base therefor which enables a single piece base no larger than the prior base for a two wire block of this type, to be quickly fitted for two or three wire systems with various combinations of fusible, switching, testing and other connector elements having the required safety and manipulating characteristics and spacings, thereby facilitating the production of and affecting economies in the manufacture of two and three pole main line cut-out and meter testing switches adapted to satisfy the various conditions which arise in practice.

In attaining this result a single piece base is formed in such manner as to provide means which enable five or less conducting paths, composed of various types of fusible and non-fusible connectors arranged in different relations, to be located side by side on the face of the base, the design of the base however being such that each leg of a circuit is guarded from the other leg or legs by an insulating barrier, and at least one leg contains a fusible connector located adjacent to a barrier in an intermediate path.

In the accompanying drawings Figure 1 shows a plan of a three-pole connection block fitted with three non-fusible switching connectors and two screw plug fusible connectors located between the switching connectors, which embodies the invention. Fig. 2 is a vertical section of the block on the plane indicated by the dotted line 2—2 on Fig. 1. Fig. 3 shows a plan of a three-pole connection block fitted with two non-fusible switching connectors, one non-fusible screw connector, and two cartridge fuse connectors located intermediate the non-fusible connectors. Fig. 4 is a vertical section of the block on the plane indicated by the dotted line 4—4 on Fig. 3. Fig. 5 is a plan of the plug fuse base shown in Fig. 1. Fig. 6 is a side view of the plug fuse base. Fig. 7 is a front view of the plug fuse base. Fig. 8 is a plan of the cartridge fuse base shown in Fig. 3. Fig. 9 is a side view of the cartridge fuse base. Fig. 10 is a front view of the cartridge fuse base. Fig. 11 shows a side view of a plug fuse. Fig. 12 shows a side view of a cartridge fuse. Fig. 13 is a plan of a solid connector that may be used. Fig. 14 is an edge view of the connector shown in Fig. 13. Fig. 15 is a plan of another solid connector. Fig. 16 is an edge view of the connector shown in Fig. 15. Figs. 17 to 24 inclusive are diagrammatic illustrations of some of the various ways in which the connections from the service wires through a meter to the load wires may be made by means of the improved block.

The base or mounting portion of the complete block, which is the foundation of the invention, is a single piece 1 of insulating material, preferably porcelain, shaped so as to integrally provide the desired placements for the various conductor elements to be located thereon. The base has five placements, seats or paths 2, 3, 4, 5 and 6 that extend parallel with each other across the top of the base, Figs. 5 and 8.

The placement 2 near one side has recesses 7 near the front and back edges and screw holes 8 and 9. The placement 6 near the other side has recesses 10 near the front and back edges and screw holes 11 and 12. In the arrangement illustrated in Figs. 1 and 2 these placements are occupied by non-fusible switching connectors which comprise terminals 13 set in the recesses and switch blades 14 pivoted to the terminals on one side and adapted to be swung into and out of engagement with the terminals on the other side. These terminals on one side are shown as provided with binding screws 15 and on the other side with binding screws 16 and meter testing lugs 17.

The middle placement 4 has recesses 18 near the front and back edges with screw holes 19 and 20, Figs. 5 and 8. In the arrangement illustrated in Figs. 1 and 3 these placements are shown as occupied by non-fusible connector elements, the former comprising terminals 21 set in the recesses with a switching blade 22 pivoted to one terminal and adapted to be swung into and out of engagement with the other terminal, and the latter comprising terminals 23 set in the recesses and joined by a screw threaded connector 24. These terminals may have testing lugs at one end and wire clamps 26 at the other end.

The placements 3 and 5, which are between the middle placement and the outer placements, have recesses 27 near the front and back edges with screw holes 28, 29 and 30, Figs. 5 and 8. In the arrangement illustrated in Fig. 1 these recesses are shown as occupied by terminals 31 and 32, the former of which is connected with a center contact screw socket 33 and the latter with a screw threaded socket 34 which is adapted to receive a screw plug fuse 35 of the well known Edison type, Fig. 11. In the arrangement illustrated in Fig. 3 the recesses are occupied by terminals 36 which are connected with spring clips 37 designed to receive cartridge fuse connectors 38, Fig. 12. These terminals may be provided with wire clamps 39 and with testing lugs 40 as desired.

Separating the central placement 4 from those on each side are barriers of insulating material rising from the face of the base in such manner as to guard against any accidental connection, or arcing or leakage between the nonfusible connector that may be located in the middle and the fusible connector on either side of the middle. Where the bases are designed for screw plug fuses, as shown in Fig. 1, the barrier walls 41 are arranged to partly encircle the plug socket. Where the bases are designed for cartridge fuses, as shown in Fig. 3, the barrier walls 42 may be straight and extend adjacent to the terminals of the cartridge.

To permit connection from the outer paths to the next adjacent paths, grooves 43 are formed in the under or back side of the base as illustrated by dotted lines in Figs. 5 and 8. A conductor may be placed in either of the grooves 43, 43 and connected at its end respectively with one of the contacts of the fused connector and with one end of the adjacent outer unfused connector. Connections between the conductor in the groove 43 and the corresponding connector parts may be made by means of screws or other conductors extending through the said holes 12 and 30 in the base.

Figs. 17 to 24 inclusive, show various ways in which connectors may be mounted on a base which embodies this invention, and connected with service wires S, meter M and load wires L. Fig. 17 shows a two-wire, two-pole switch, double fused, arrangement with the fuses before and the switch after the meter. Fig. 18 shows a two-wire, two-pole switch, single fuse and one stationary non-fusible connector arangement with the fuse before and the switch after the meter. Fig. 19 shows a two-wire, one-pole switch, one fuse, arrangement with the fuse before and the switch after the meter. Fig. 20 shows a two-wire, two-pole switch, double fused, loop connection. Fig. 21 shows a two-wire, two-pole switch, double fused, straight through connection. Fig. 22 shows a three-wire, two-pole switch, double fused, straight through arrangement. Fig. 23 shows a three-wire, two-pole switch, double fused arrangement with the fuses before and the switch after the meter. Fig. 24 shows a three-wire, three-pole switch, double fused, bus connection, with the fuses before and the switch after the meter. In these arrangements 44 indicates fuse connectors, 45 non-fusible switching connectors, 46 non-fusible permanent connectors, and 47 non-fusible connectors joining the fusible connectors with the outside non-fusible connectors. It will be observed from these diagrams, which represent but a few of the arrangements that may be made, that the disposition of the fusible and non-fusible connectors is such, and the spacing and protection between the connectors on one leg and the connectors on another leg, are such that whether the devices are arranged for two or three wires they will meet the safety requirements.

The connectors to be mounted in the paths or placements on the base are of two broadly distinct kinds, fused and unfused, with suitable means at the ends for the connection of circuit wires. The fuses may be of the plug type or cartridge type, and of course the fuse receiving means will be clips for the cartridge fuses, or screw shell and center contact for the screw plug fuses.

The unfused type of connectors may be constructed as switches to provide for the opening or closing of current paths, or may be constructed so as to provide permanent paths. If a connector is to be non-circuit opening, it may be a continuous piece of the shape shown in Figs. 13 and 14 or of the shape shown in Figs. 15 and 16, or it may have the screw connection adapted if necessary to be removed for opening a circuit, as shown in Fig. 4.

In the attainment of the peculiar advantages of this invention it is necessary that the base be designed so that certain of the placements will take fused connectors while certain others will take unfused connectors, the unfused and fused connectors being alternated. Preferably the base is so made that the central placement will take an unfused connector while on each side of the center the base will take fused connectors, and outside of the fused connectors unfused connectors. Consequently the base has five placements providing for, starting from either side, an unfused path, a fused path, an unfused path, a fused path, and unfused path. In order to permit of the placement of a centrally disposed unfused connector, particularly if a switching blade, between the two fused connectors, and ensure the proper safety spacings between these particular placements, the base has insulating barrier walls on each side of the central path and between it and the adjacent paths, which barriers serve to guard the connectors in these paths and prevent surface leakage from one to the other. This arrangement allows compactness of the complete device and permits of three wire mountings on a relatively small base.

While the base is designed to receive five connectors, it is not essential that all of the five paths be occupied. The number of connectors used may be five or less, dependent upon the particular service to be performed. However in the usual arrangement the two outside connectors on one side are connected in one leg of the circuit and the two outside connectors on the other side are connected in the other leg of the circuit. In the central path there may be safely placed a connector for a third leg.

It will be understood that I do not broadly claim the placement of fusible and non-fusible connectors side by side on a base. I do, however, claim as a part of my invention a construction which includes a base provided with means for the placement of connectors at the front thereof and also provided with means at the back for the connection of adjacent connectors in series with each other. This connection of two adjacent connectors in series is effected by means of connectors located in the grooves 43 formed in the back side of the base as already described. The invention also relates to a construction including a base which permits either the placement of five (or less) independent connectors side by side on the base or the connection together in series of the two connectors constituting either or both of the two outer pairs of said connectors. Figs. 17, 18, 19, 23 and 24 provide illustrations of five (or less) independent connectors extending across the base; and Figs. 20, 21 and 22 provide illustrations of adjacent connectors connected in series by means of conductors in the grooves 43.

The invention claimed is:—

1. An insulating base for a switch formed at the front to receive for mounting thereon conducting means constituting two parallel current paths across the front thereof, the said base being also formed with holes extending rearward therethrough from the locations for the respective current paths and with a transverse groove in the back thereof communicating with the said holes, the said base being thus adapted either for mounting conducting means including a terminal at each end of each path or for mounting conducting means omitting the terminal at one end of each path but including conducting elements located in the said holes and grooves and connecting the said paths.

2. A fused switch comprising in combination a base of insulating material formed at the front to receive for mounting thereon conducting means constituting two parallel current paths across the front of base, conductors including fuse contacts carried by the base at the front thereof and together with a fuse constituting one of the said current paths, and other conductors including fixed switch contacts and a movable switch blade carried by the base at the front thereof and constituting the other of the said current paths, the aforesaid base being also formed with holes extending rearward therethrough from the respective current paths and with a transverse groove in the back thereof communicating with the said holes, the said holes and groove being adapted for receiving conducting elements forming a direct electrical connection between the two paths.

3. A fused switch comprising in combination a base of insulating material formed at the front to receive for mounting thereon conducting means constituting two parallel current paths across the front of base and also formed with a groove in the back thereof extending transversely from a point at the rear of one path to a point at the rear of the other path, conductors including fuse contacts carried by the base at the front thereof and together with a fuse constituting one of the said current paths, other conductors including fixed switch contacts and a movable switch blade carried by the base at the front thereof and constituting the other of the said current paths, and a third conductor located at the back of the base in the said transverse groove and serving to connect one of the said fuse contacts with one of the said switch contacts.

4. A fused switch comprising in combination, a base of insulating material formed at the front to receive for mounting thereon conducting means constituting four parallel current paths across the front of base, two sets of conductors carried by the base, each including fixed switch contacts and a movable switch blade, the said sets of conductors constituting the outer two of the aforesaid current paths, the other sets of conductors carried by the base, each including a pair of fuse contacts, the said sets of conductors together with fuses constituting two current paths between and respectively adjacent the said outer paths, the aforesaid base being also formed with holes extending rearward therethrough from the respective current paths and with two separate transverse grooves in the back thereof each communicating with two holes corresponding to one switch path and to the adjacent fuse path, and conducting elements in the said holes and grooves forming direct electrical connections between the two switch paths and the respective fuse paths.

5. An electrical connection block comprising a single piece insulating base having a plurality of wire-attaching means at the top and bottom, fuse-receiving means permanently mounted on the base and each having one contact connected with wire-attaching means at the top of the base and the other contact connected with wire-attaching means at the bottom of the base, a switching conductor on the base between the fuse receiving means, switching conductors on the block outside of the fuse-receiving means, said switch conductors being adapted to connect wire-attaching means at the top and bottom of the base, and recesses in the bottom of the base adapted to receive conductors, said recesses extending from one of the contacts of each of the fuse-receiving means to one of the conductors of each of the outside switching conductors, thereby enabling the base to be assembled with five straight through parallel electrical paths, or assembled with one straight through path and two zigzag paths, with the incoming and outgoing connections at the opposite edges of the base.

JOSEPH SACHS.